United States Patent [19]

Cody

[11] 4,390,414
[45] Jun. 28, 1983

[54] SELECTIVE DEWAXING OF HYDROCARBON OIL USING SURFACE-MODIFIED ZEOLITES

[75] Inventor: Ian A. Cody, Sarnia, Canada

[73] Assignee: Exxon Research and Engineering Co., Florham Park, N.J.

[21] Appl. No.: 331,262

[22] Filed: Dec. 16, 1981

[51] Int. Cl.³ ............................................. C10G 47/18
[52] U.S. Cl. ............................... 208/111; 252/455 Z
[58] Field of Search ................................. 208/111, 20

[56] References Cited

U.S. PATENT DOCUMENTS

| | | | |
|---|---|---|---|
| 2,722,504 | 11/1955 | Fleck | 585/418 |
| 3,207,699 | 9/1965 | Harding et al. | 252/430 |
| 3,213,156 | 10/1965 | Harding et al. | 585/664 |
| 3,280,096 | 10/1966 | MacKenzie | 260/94.9 |
| 3,389,092 | 6/1968 | Sanford et al. | 252/430 |
| 3,578,398 | 5/1971 | Jenkins | 23/113 |
| 3,644,220 | 2/1972 | Kearby | 252/442 |
| 3,647,681 | 3/1972 | Egan | 208/111 |
| 3,658,696 | 4/1972 | Shively et al. | 208/310 |
| 3,682,996 | 8/1972 | Kerr | 260/448 |
| 3,698,157 | 10/1972 | Allen | 55/67 |
| 3,702,293 | 11/1972 | Hayes et al. | 208/139 |
| 3,724,170 | 4/1973 | Allen | 55/67 |
| 3,725,302 | 4/1973 | Shively et al. | 252/431 |
| 3,726,809 | 4/1973 | Allum et al. | 252/431 |
| 3,965,210 | 6/1976 | Chu | 585/454 |
| 3,980,586 | 9/1976 | Mitchell | 252/455 |
| 4,002,697 | 1/1977 | Chin | 585/454 |
| 4,053,534 | 10/1977 | Mitchell et al. | 585/511 |
| 4,080,284 | 3/1978 | Mitchell | 208/111 |
| 4,088,605 | 5/1978 | Rollmann | 252/455 |
| 4,100,219 | 7/1978 | Rodewald | 585/640 |
| 4,148,713 | 4/1979 | Rollman | 208/111 |
| 4,259,174 | 3/1981 | Chen et al. | 208/111 |
| 4,376,036 | 3/1983 | Garwood et al. | 208/111 |

FOREIGN PATENT DOCUMENTS

| | | | |
|---|---|---|---|
| 934130 | 9/1973 | Canada | 23/188 |
| 1413470 | 11/1975 | United Kingdom | |

OTHER PUBLICATIONS

"Modification of HY Zeolite by Reaction with Tetramethylsilane", McAteer et al., ACS Advances in Chem. 121, 1973, pp. 258-265.

"Sorption of Hydrocarbons and Water in Silanated and Unsilanated Partial H-forms Zeolite Y", Barrer et al., JCS Faraday 1, 75 (9) 2221 (1979).

"Sorption Behavior of Silanated H-Mordenite", Barrer et al., JCS Faraday, 1, 74 1871 (1978).

"Modified Zeolites", Barrer et al., JCS Faraday 1, 74 2786, 2798 (1978).

"Study of the Surface and Bulk Hydroxyl Groups of Silica by Infrared Spectra and $D_2O$-exchange", Kiselev et al., Trans. Farad. Sor. 60 2254 (1964).

"Reactions of Chlorosilanes with Silica Surfaces", Hair et al., J. Phys. Chem., 73, No. 7, 2372 (1969).

"Reactions of Chloromethyl Silanes with Hydrated Aerosil Silicas", Armistead et al., Trans. Farad. Soc. 63, 2549 (1967).

"Adsorption and Reaction of Methylchlorosilanes at an 'Aerosil' Surface", Evans et al., J. Catalysis 11, 336–341 (1968).

"Studies of the Hydrogen Held by Solids", Uytterhoeven et al., J. Phys. Chem. 69, (6) 2117 (1965).

Zhomov et al., Zh. Khim 1969 Abst. No. 4N196.
Bulanski et al., J. Catal. 37, 383 (1975).
Beaumont et al., J. Catal. 27, 45 (1972).

*Primary Examiner*—Delbert E. Gantz
*Assistant Examiner*—G. E. Schmitkons
*Attorney, Agent, or Firm*—Joseph J. Allocca

[57] ABSTRACT

A method is described for selectively dewaxing a waxy hydrocarbon oil feedstock which method comprises contacting said waxy hydrocarbon oil stock in the presence of hydrogen with a zeolite (1) which has been chemically modified by reaction, under dry, anhydrous conditions, with an organosilane wherein the zeolite has some reactive sites capable of reacting with the organosilane and where said organosilane is: (a) capable of entering into the channels of the zeolite and chemically reacting with the reactive sites present therein, as well as (b) reacting with hydroxyl groups present on the external surface of said zeolite, and (2) which has been loaded with a catalytically active hydrogenating metal component; which contacting is conducted under conditions of pressure, temperature and liquid flow velocities sufficient to effect the hydrodewaxing. Preferably the organosilane modified zeolite, either before or after the deposition of the catalytic metal component may be heated to an elevated temperature in an inert or reducing atmosphere. This heating may be conducted as an independent operation or may be conducted in situ in the catalytic dewaxing environment. In either case, the atmosphere employed is inert or reducing and is preferably hydrogen or contains hydrogen. Such deliberate or in situ heating is conducted to form a stable surface resulting from condensation-polymerization reactions.

23 Claims, 7 Drawing Figures

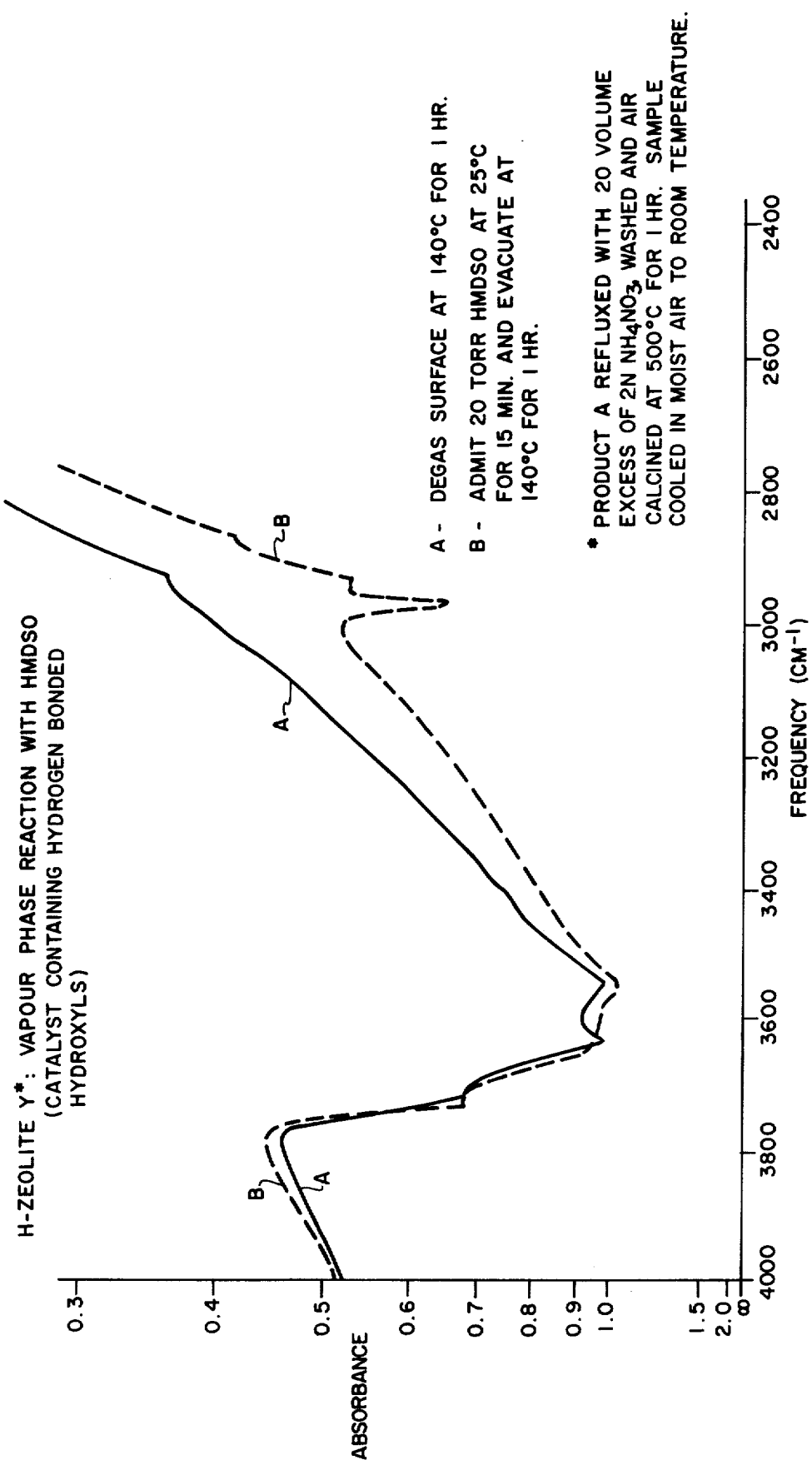

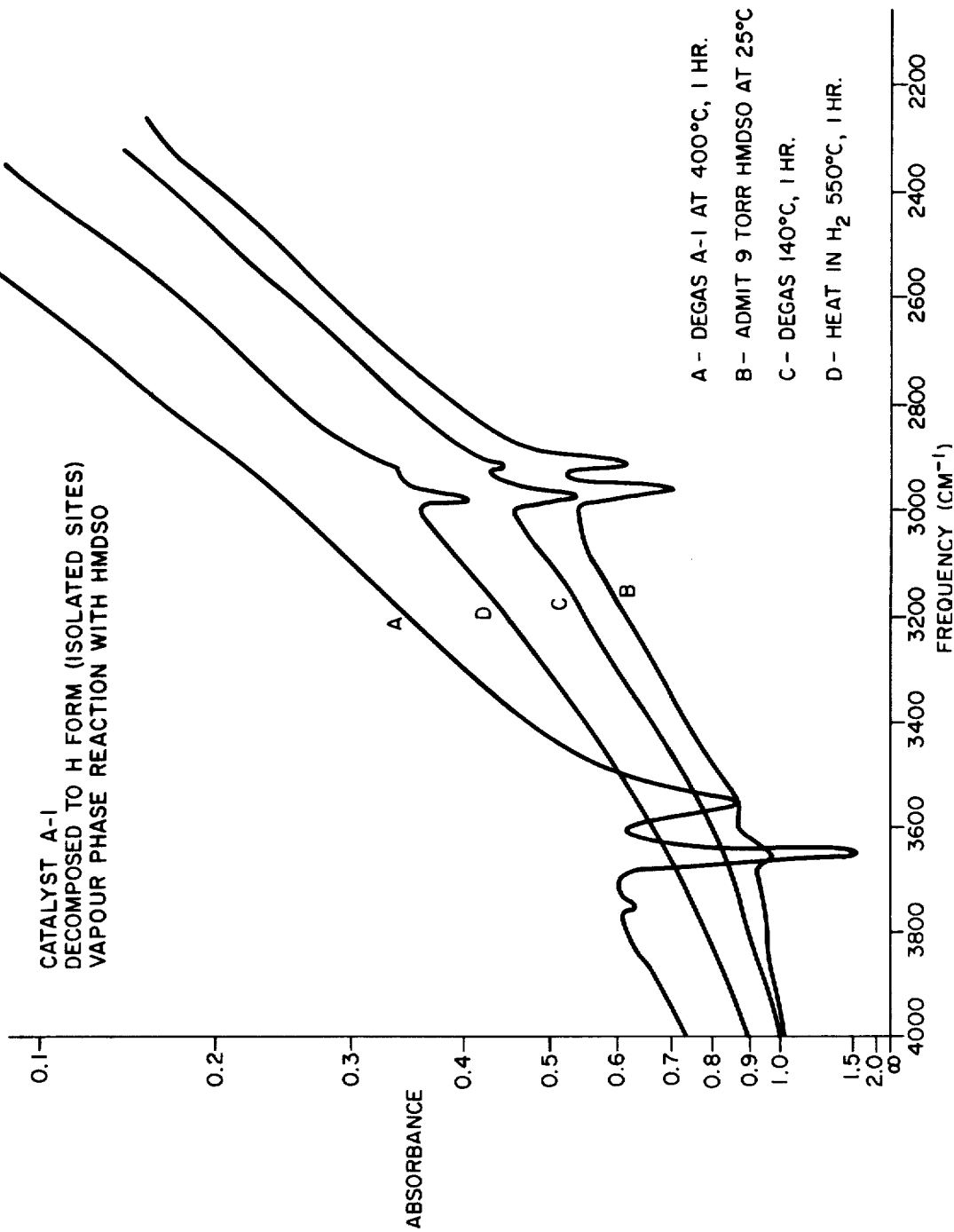

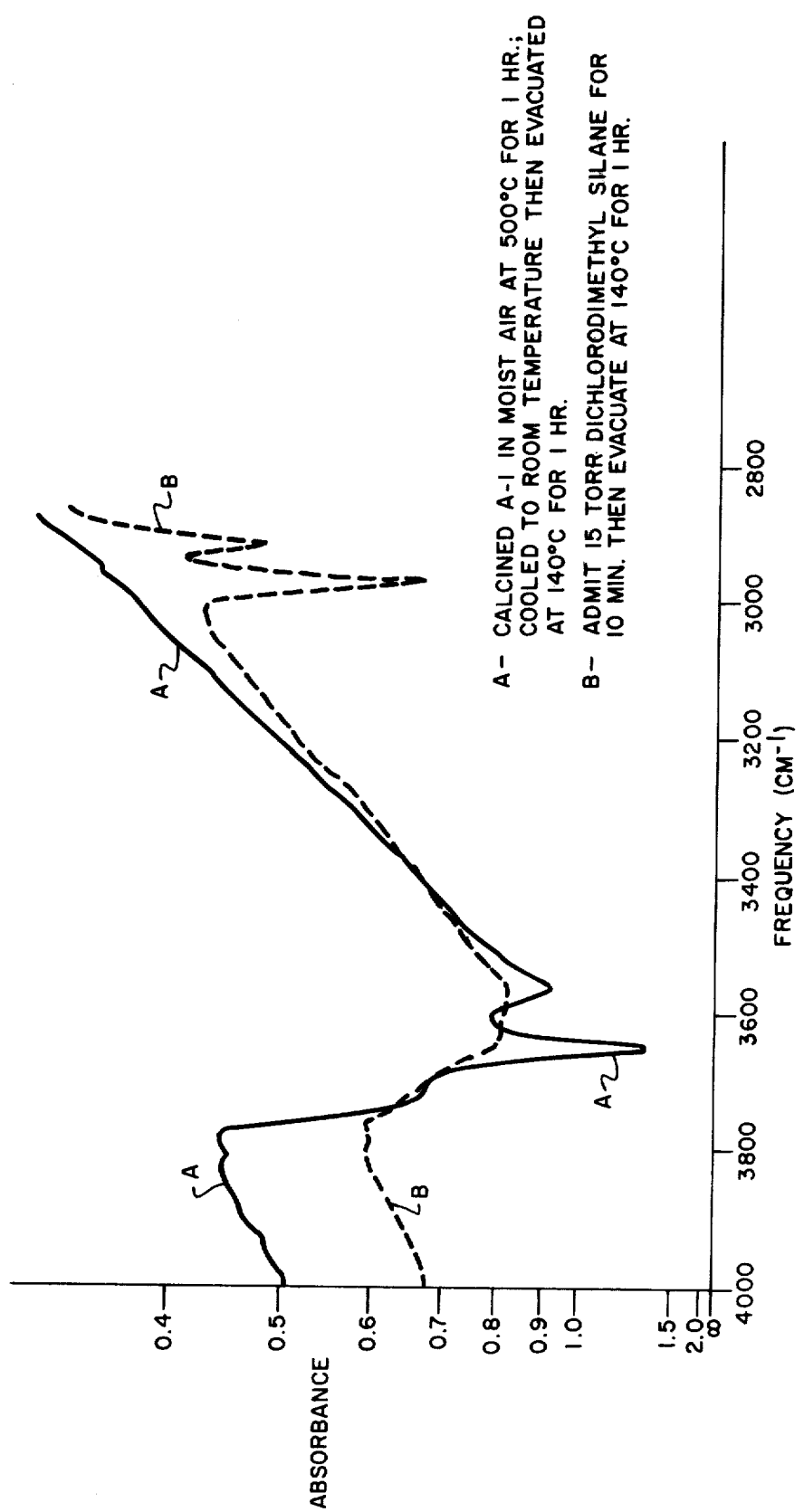

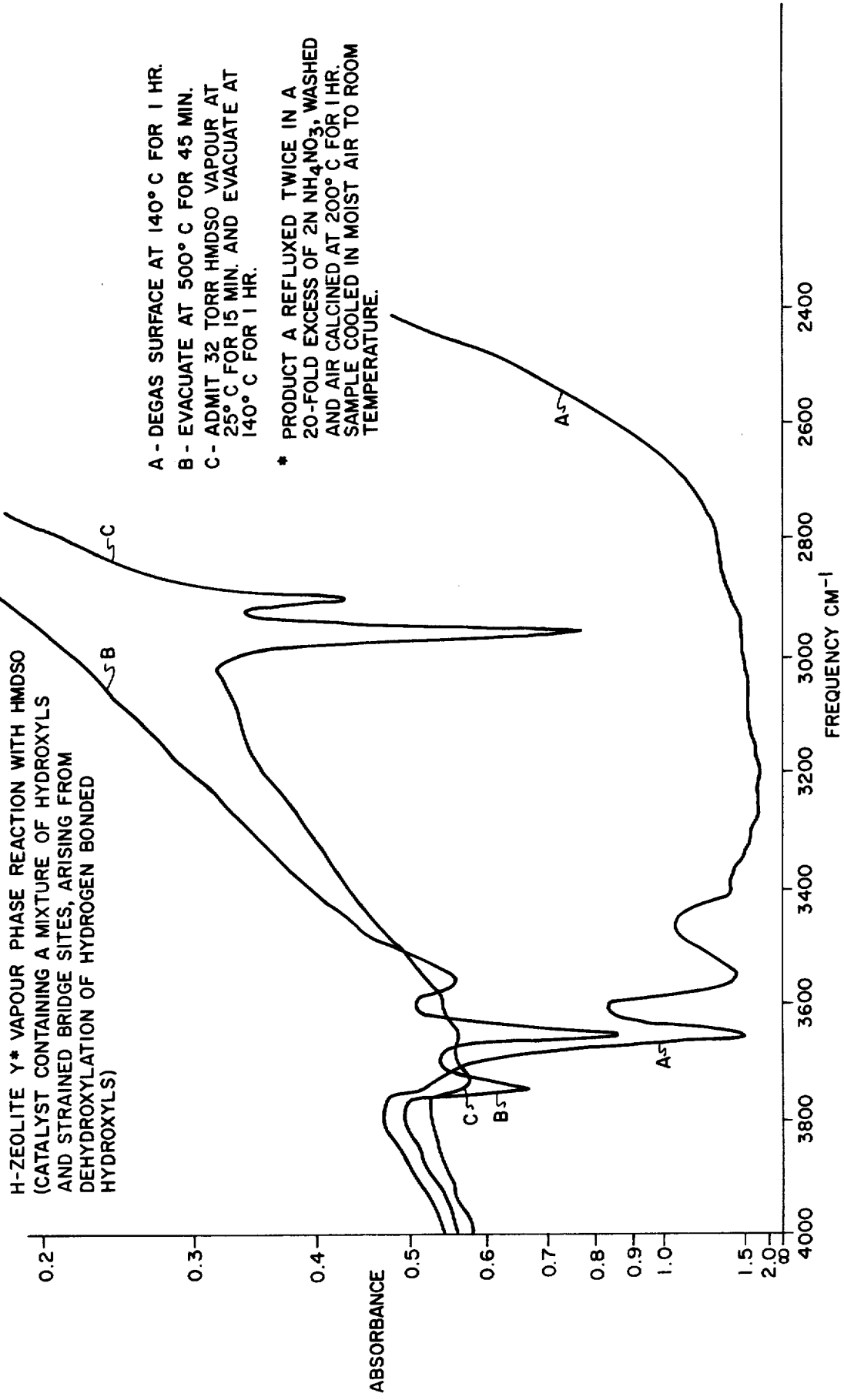

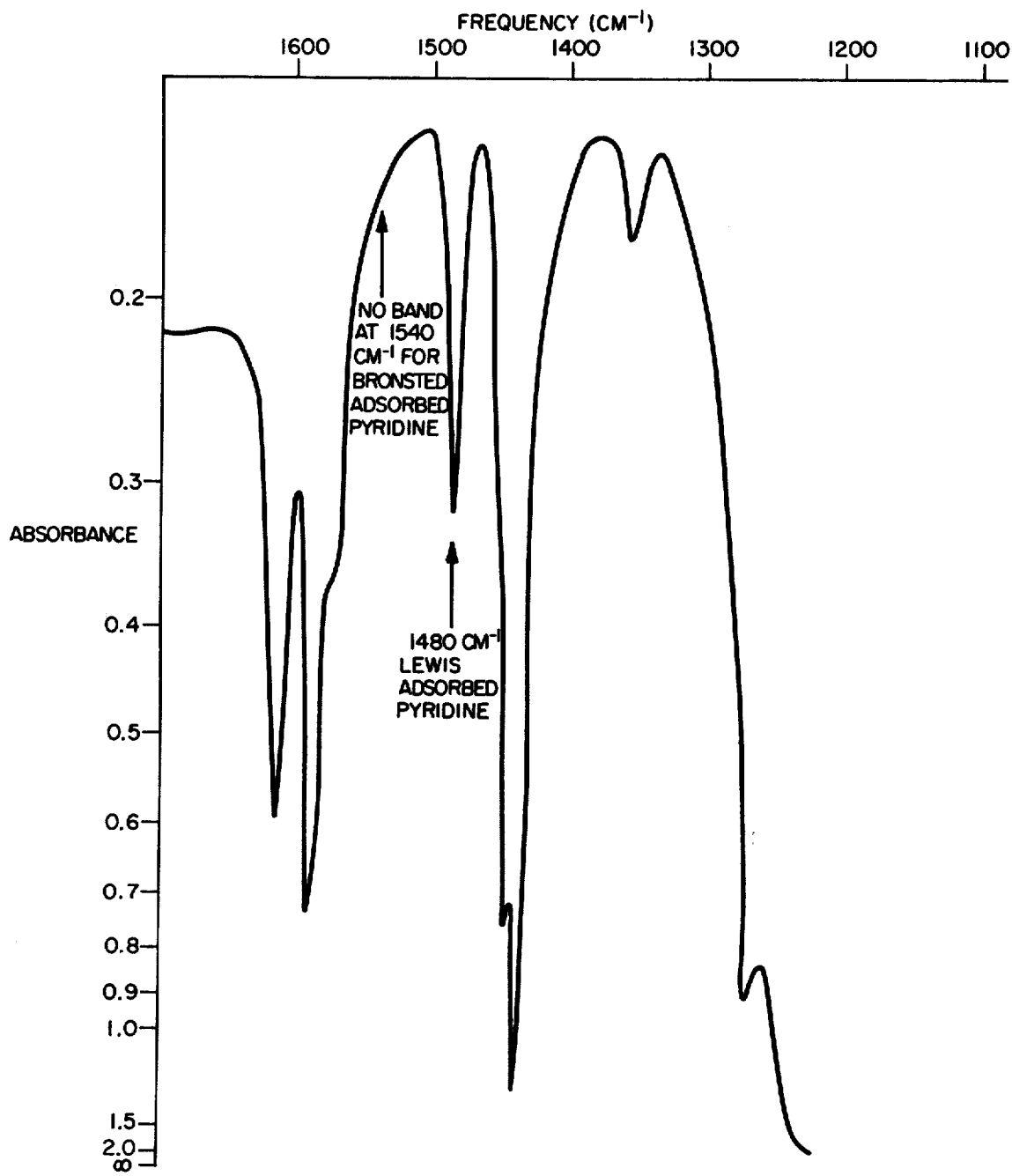

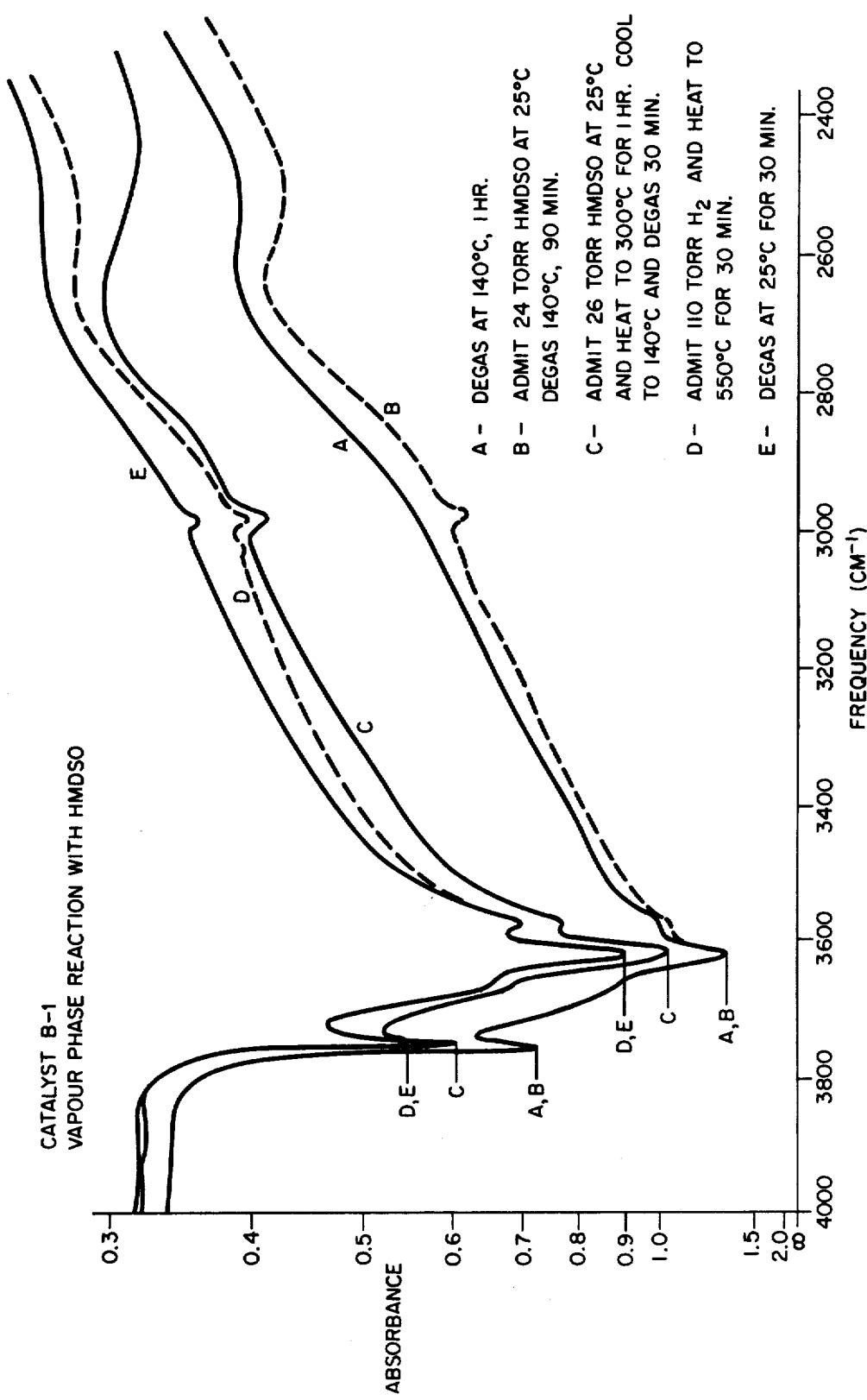

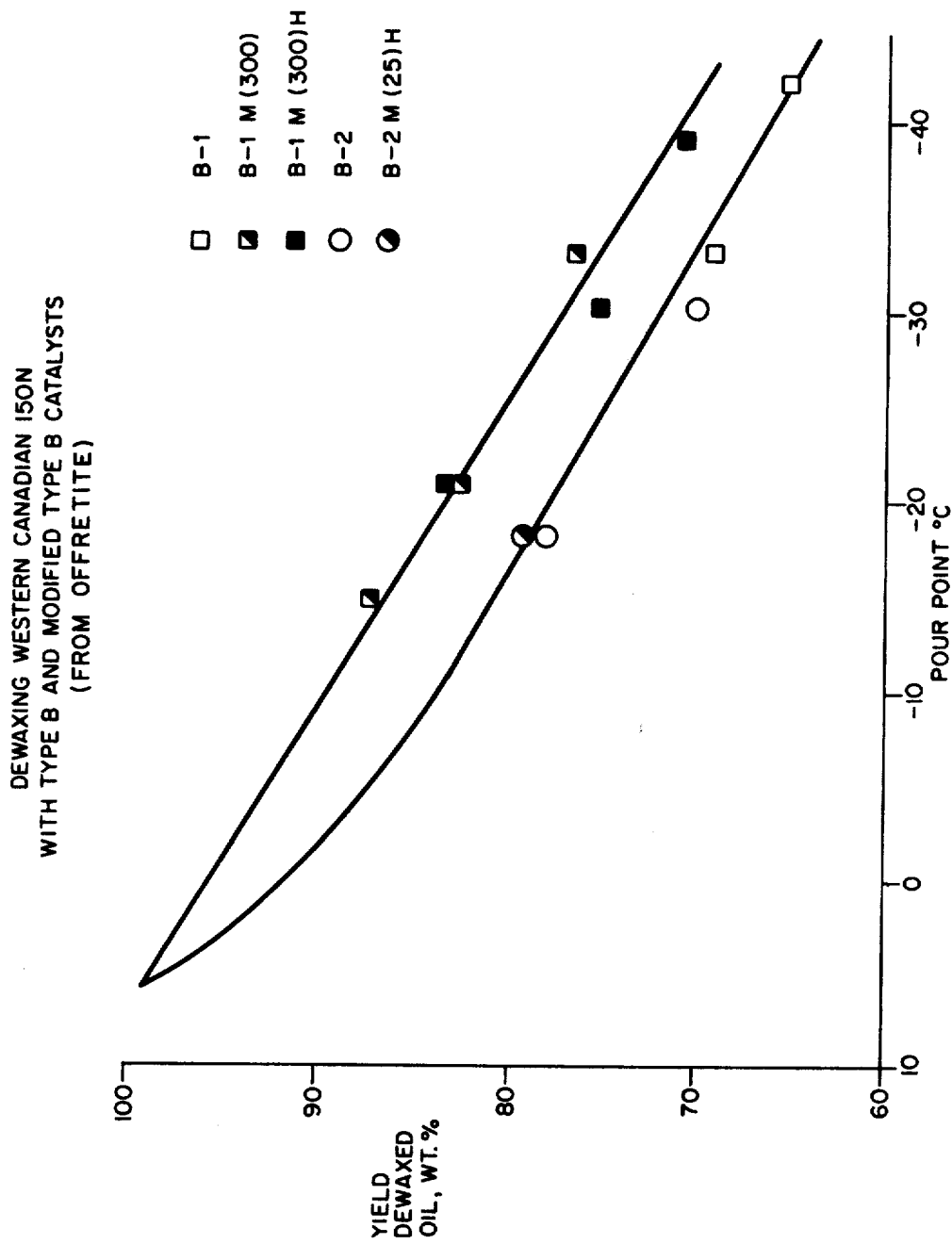

SELECTIVE DEWAXING OF HYDROCARBON OIL USING SURFACE-MODIFIED ZEOLITES

DESCRIPTION OF THE INVENTION

A method is described for selectively dewaxing a waxy hydrocarbon oil feedstock which method comprises contacting said waxy hydrocarbon oil stock in the presence of hydrogen with a zeolite (1) which has been chemically modified by reaction, under dry, anhydrous conditions, with an organosilane wherein the zeolite has some sites capable of reacting with the organosilane and wherein said organosilane is: (a) capable of entering into the channels of the zeolite and chemically reacting with the reactive sites present therein, as well as (b) reacting with hydroxyl groups present on the external surface of said zeolite, and (2) which has been loaded with a catalytically active hydrogenating metal component; said contacting being conducted under conditions of pressure, temperature and liquid flow velocities sufficient to effect the hydrodewaxing. Preferably the organosilane modified zeolite, either before or after the deposition of the catalytic metal component may be heated to an elevated temperature in an inert or reducing atmosphere. This heating may be conducted as an independent operation or may be conducted in situ in the catalytic dewaxing environment. In either case, the atmosphere employed is inert or reducing and is preferably hydrogen or contains hydrogen. Such deliberate or in situ heating is conducted to form a stable surface resulting from condensation polymerization reactions. The temperatures chosen for imparting this stability are usually at or above the temperature of the subsequent catalytic process, but, preferably about 300° to 500° C., more preferably 400° to 500° C.

The waxy hydrocarbon oil which is dewaxed may be any natural or synthetic hydrocarbon oil, preferably a waxy petroleum oil, most preferably a waxy specialty oil such as a lube or transformer oil.

Under certain conditions, treatment with organosilanes may improve the hydrodewaxing selectivity and activity maintenance of zeolites known to have some utility for this process. Furthermore, zeolites which are known to have little or no hydrodewaxing selectivity can be converted to this use by treatment with organosilanes.

BACKGROUND

Silylation of surfaces has been practiced extensively since the early 1950's. U.S. Pat. No. 2,722,504 to Fleck described methods for improving the organophilicity of catalysts and adsorbents by treating with compounds of the general type $R_1R_2R_3SiX$ where $R_1R_2$ and $R_3$ may be organic non-hydrolyzable moieties and x is a hydrolyzable group including halogens, alkoxy and other groups which separate from silicon in the presence of water. Though Fleck did not describe the reaction, the surface hydroxyls of insulating surfaces like silica, alumina, magnesia and zeolites, may interact with such silanes in the following way:

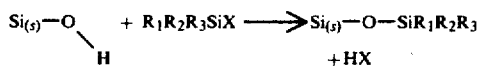

(s) denotes a surface silicon Many variations on this reaction with other silicon reagents and other surfaces but particularly silica have been studied, see: "Study of the Surface and Bulk Hydroxyl Groups of Silica by Infra-red Spectra and D₂O Exchange", Kiselev et al, Trans. Farad. Soc. 60, 2254 (1964); "Reactions of Chlorosilanes with Silica Surfaces" Hair et al., J. Phys. Chem. 73 #7, 2372 July 1969; "Reactions of Chloromethyl Silanes with Hydrated Aerosil Silicas" Armestead et al., Trans. Farad. Soc. 63, 2549 (1967); "Adsorption and Reaction of Methylchlorosilanes at an 'Aerosil' Surface" Evans et al., J. Catalysis 11, 336–341 (1968).

More recently, patents have been issued pertaining to the reactions of organosilanes with zeolites and the subsequent benefits of this treatment.

U.S. Pat. No. 3,682,996 issued to Kerr claims a zeolite ester product (more properly described as a silicon ether) derived from the reaction between a silane containing an available hydrogen atom and an aluminosilicate zeolite.

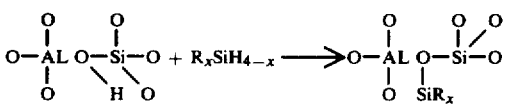

where x is between 1 and 4 and where R is independently at least one organic radical, suitably aryl, alkyl, acyl, aralkyl but preferably alkyl because the pore structure will more readily accept alkylsilanes than arylsilanes. Apart from these classes of silanes Kerr makes a reference to one other silane not fitting this formula, hexamethyl disilazane. Kerr does not disclose or claim usage of halosubstituted silanes.

The reactions described by Kerr all occur under vacuum conditions wherein the outgassed H form zeolite is contacted with pure organosilane vapor or liquid at various temperatures. Kerr discloses, but does not demonstrate or claim, that the silylated zeolite may be used in catalytic applications, including "certain shape selective catalyzed reactions".

U.S. Pat. No. 3,726,309 to Allum claims a product derived from the reaction of an inorganic material containing hydroxyl groups, including aluminosilicates, modified by treatment with an organic radical substituted silane. Bound silicon ethers are formed by reaction with the surface hydroxyl groups.

U.S. Pat. No. 3,658,696 to Shively claims an improved separation process resulting from the reactions of zeolite molecular sieves with organosilanes. The replacement of OH radicals on the zeolite surface with silane radicals significantly affects the surface adsorption properties of the molecular sieve because the hydroxyl groups are the main centers of surface adsorption. In this instance bulky silanes were chosen which reacted with only the external surface of the zeolite.

Zhomov et al., Katal, Pererab, Uylevodorad, Syr'ya 1968 (2) 9 (from Ref. Zh. Khim 1969 abstract No. 4N196) used a methyl chlorosilane to change the properties of an aluminosilicate used to alkylate phenol with a tetrameric propylene.

U.S. Pat. No. 3,980,586 to Mitchell claims a new product resulting from a sequence of silylation, calcination and steaming of a group of materials consisting of alumina, silica alumina and aluminosilicates. Calcining continues for a sufficient time and at high enough temperatures to remove all of any introduced organic or halogen substituent (unlike Kerr, Mitchell has used a more general form of silanes which includes halogens).

The amount of silane used was sufficient to achieve about 1-5% of a new SiO$_2$ layer. U.S. Pat. No. 4,080,284 to Mitchell claims the new materials to be useful for catalytic hydroconversion.

U.S. Pat. No. 4,002,697 to Chen used a silane treatment on ZSM-5 to improve the yield of p-xylene from methylation of toluene. In this instance the silane was chosen so as to interact only with the external surface.

U.S. Pat. No. 3,698,157 and U.S. Pat. No. 3,724,170 to Allen demonstrated that improved separation of C$_8$ aromatics could be achieved by contacting alumino-silicate adsorbents with organic radical or halo substituted silanes.

APPLICATION OF SILYLATION TO HYDRODEWAXING

Despite the wealth of work reported on silane treated surfaces it had yet to be demonstrated that silylation can improve the hydrodewaxing activity of zeolite based catalysts.

An ideal hydrodewaxing catalyst would have several necessary chemical and physical features.

The zeolite would have a pore size which is large enough to admit waxy n-paraffins and slightly branched paraffins but small enough to exclude, or diffuse only slowly, "non-paraffinic" oil molecules. The relative rates of zeolite diffusion of waxy and non-waxy components would be sufficiently different so as to favour the selective conversion of the paraffinic species.

Further the ideal zeolite should have a relatively low total population of acidic (hydroxyl) sites but also a finite concentration of highly acidic sites. Such a system would be relatively hydrophobic to improve the diffusional transport of paraffins to the active sites, but the few highly acidic sites in the system would be very efficient in converting the paraffins to light gas products.

The dewaxed oil product from this process would have to be stable and of high yield (comparable to solvent dewaxing).

Most of these properties are not commonly associated with zeolites but one zeolite does stand out as a system for hydrodewaxing and many other hydroconversion processes; Mobil's ZSM-5 (U.S. Pat. No. 3,702,886). ZSM-5 has a highly stable framework containing two types of intersecting channels which have ten-membered ring openings. These are therefore intermediate between those of classical shape-selective zeolites with 8 membered rings (zeolite A, erionite) and the larger pore 12 membered ring zeolites (faujasite, X,Y, mordenite and fault free offretite).

ZSM-5 has two sets of channels, in one direction the channels are sinusoidal with near circular openings of about 0.55 nm. The other channels are straight with elliptical cross section (0.52-0.58 nm) Nature 272, 437 (1978). Further the zeolite can be crystallized with very high SiO$_2$ contents giving it hydrophobic properties. The success of ZSM-5 as a selective dewaxing catalyst is that the zeolite imposes configurational diffusion restrictions within the pores rather than by molecular screening which is observed for the smaller pore, classical, shape selective zeolites.

In the present case three zeolites have been studied to determine the potential for improved hydrodewaxing performance by silylation of zeolite. Two of the zeolites (mordenite and offretite) have pore diameters in the range known to be effective for hydrodewaxing, although mordenite (6.96×5.81 elliptical) and offretite (6.4 Å circular) are both larger than ZSM-5 (5.5 Å circular and 5.4×5.7 Å elliptical). The other zeolite, zeolite Y, has a large pore (7.4 Å) and is not known to demonstrate shape selective properties.

Zeolite Y is one of the largest known 12 ring zeolites and is used in hydrocracking applications where hydrocarbon molecules of various types and shapes are converted. One useful feature of this type of structure is that it has a 3 dimensional network of connecting supercages which not only permits organosilanes to be readily adsorbed (see: "Modification of H Y Zeolites by Reaction with Tetramethylsilane" McAteer et al., ACS Advances in Chem 121 1973, "Molecular Sieves" ed. W. M. Merer & J. B. Uytterhoeven and "Sorption of Hydrocarbons and Water in Silanated and Unsilanated Partial H-Forms of Zeolite Y" Barrer et al., J. C. S. Faraday 1 75 (9) 2221 (1979)) but could potentially be a surface network that rapidly diffuses hydrocarbon (e.g. wax) molecules although these references do not teach, suggest or imply such a use.

In principle each of these zeolite systems could be improved by silylation since each has an inherently larger pore than ZSM-5 and the systems are highly hydrophilic in their "as crystallized forms".

In the present invention the use of such surface modified zeolites for catalytic dewaxing of waxy hydrocarbon oils is revealed for the first time.

DESCRIPTION OF THE FIGURES

FIG. 1 shows the infrared spectrum of the vapor phase reaction of hexamethyldisiloxane, (HMDSO) with H-zeolite Y (containing hydrogen bonded hydroxyls).

FIG. 2 shows the infrared spectrum of the vapor phase reaction of HMDSO with H-zeolite Y (containing isolated sites).

FIG. 3 shows the infrared spectrum of vapor phase reaction of dichlorodimethyl silane with H-zeolite Y containing mixed isolated and hydrogen bonded hydroxyls.

FIG. 4 shows the infrared spectrum of the vapor phase reaction of HMDSO with H-zeolite Y, containing reactive sites comprising a mixture of isolated hydroxyls and strained bridge sites arising from dehydroxylation of hydrogen bonded hydroxyls.

FIG. 5 shows infrared spectrum of the adsorption of pyridine on HMDSO modified catalyst A-1.

FIG. 6 shows the infrared spectrum of the vapor phase reaction of catalyst B-1 (offretite) with HMDSO.

FIG. 7 shows the dewaxing performance on Western Canadian 150N of Type B and modified Type B catalyst (from Offretite).

THE INVENTION

A method is described for selectively dewaxing a waxy hydrocarbon oil feedstock which method comprises contacting said waxy hydrocarbon oil stock in the presence of hydrogen with a zeolite (1) which has been chemically modified by reaction, under dry, anhydrous conditions, with an organosilane wherein the zeolite has some sites capable of reacting with the organosilane and wherein said organosilane is: (a) capable of entering into the channels of the zeolite and chemically reacting with the reactive sites present therein, as well as (b) reacting with hydroxyl groups present on the external surface of said zeolite, and (2) which has been loaded with a catalytically active hydrogenating metal component; said contacting being conducted under conditions of pressure, temperature and liquid flow velocity sufficient to effect the hydrodewaxing.

DESCRIPTION OF OILS

The waxy oils which can be processed by these catalysts range from light middle distillates or heating oils, boiling in the range 200° C.-385° C., to heavy lube distillates and deasphalted vacuum residuum boiling up to 580° C. Preferred oils are light and middle distillate oils and raffinates, such as kerosene, lube or transformer oils.

The oils used to exemplify catalyst performance are described in detail in Table 1.

DESCRIPTION OF ZEOLITES

The zeolite which is surface modified and loaded with a catalytically active hydrogenating metal component (or vice versa) may be any natural or synthetic unfaulted alumino-silicate material such as mordenite, offretite, (both natural and synthetic), offretite type zeolites, zeolite X, zeolite Y, zeolite L, zeolite omega, etc.

For the purposes of the application, both natural and synthetic zeolites are contemplated. Zeolite material embraced in this application fall into two broad categories, those having an average pore size of about 7 A or greater, which are termed "large pore zeolites" and those having an average pore size of less than about 7 A, which are termed "intermediate pore zeolites". Representative of "large pore zeolites" are zeolite X, Y, L, omega. Representative of "intermediate pore zeolites" are mordenite, offretite, offretite type zeolites, ZSM-5, erionite.

DESCRIPTION OF ORGANOSILANES

In this invention, the zeolites of either category are treated with organosilanes under specific conditions which were explained in greater detail above to effect condensation and polymerization.

The organosilanes employed in the preparation of the catalyst useful in the process of the present invention come from the classes:

$SiR_yX_{4-y}$ and $(R_wX_{3-w}Si)_2-Z$; wherein: $y=1$ to 4; $w=1$ to 3 $R=$alkyl, aryl, H, alkoxy, arylalkyl, and where R has from 1 to 10 carbon atoms; $X=$halide and $Z=$Oxygen or NH or substituted amines or amides.

Examples of useful organo silanes are: hexamethyl disilazane hexamethyldisiloxane, dichlorodimethyl silane, monochloro trimethyl silane, methoxytrimethyl silane, N-methyl-N-trimethyl silyl trifluoro acetamide.

The organosilanes found most useful in this work are hexamethyl disiloxane (HMDSO) and hexamethyl disilazane (HMDS).

DESCRIPTION OF DEWAXING CONDITIONS

Typical conditions for hydrodewaxing with these catalyts are 250°-450° C., preferably 250°-380° C. The lower temperatures are preferred so as to reduce nonselective cracking. Typical pressures employed are 200-2000 psig $H_2$, preferably 300-1000 psig $H_2$ and most preferably 400-700 psig $H_2$. Feed rates may range from 0.1 to 100 LHSV, preferably 0.1 to 10. Excess gas rates may range from 1000-20,000 SCF $H_2$/BBL but preferably from 1000-5000 SCF $H_2$/BBL.

METHOD OF GENERATING MODIFIED ZEOLITE

The object of treating zeolite catalysts with the organosilanes is to convert the surface from a hydrophilic into a hydrophobic form and to reduce the zeolite pore size and pore volume.

If zeolites are crystallized with organic templating ions such as tetramethyl ammonium ion, they must be first treated so as to remove these species. In general, zeolites are calcined to remove organic templates and/or to create enough sites for silylation by using $NH_4^+$ ion exchange or other techniques known in the art.

The zeolite containing the organic templating agent (such as tetramethylammonium) is exchanged, prior to or after calcination to decompose the templating agent, for example with $NH_4^+$ to remove cations. The zeolite is then preferably loaded with a catalytically active hydrogenating metal component using a metal salt, preferably where the metal is a cation.

The conversion into the form active for silylation may also be done before metal loading, but it is preferred that the metal be loaded on an $NH_4^+$ form of the zeolite prior to the calcination step which leads to the reactive form of the zeolite.

The metal salt is then reduced to elemental metal using techniques known in the art. Group VI and/or VIII metals can be used. Pt and Pd are particularly useful preferably in the range 0.1 to 2.0 wt % based on dry zeolite, more preferably 0.1'1.0 wt % and most preferably 0.2-0.5 wt %.

Metal loading and ammonium exchange may also follow in some instances procedures used to increase $SiO_2/Al_2O_3$ ratio such as $H_4$ EDTA leaching or other techniques well known in the art. Metal loading may also follow the silylating step, which is discussed in detail below, but preferably precedes the silylating step.

REACTIVE SITE GENERATION

After the zeolite has been exchanged and a metal salt has been deposited, the zeolite is then treated so as to generate sites which will react with the organosilane. The sites which so react are either isolated hydroxyl groups and/or strained bridge sites. For the purpose of this specification the term "reactive site" will be understood to include isolated hydroxyl groups and strained bridge site.

The method employed for the generation of isolated hydroxyl group depends upon the type of zeolite being employed and the organosilane used. An isolated site is one which has no close neighbors so that hydroxylhydroxyl interaction are minimal.

In zeolites which have low $SiO_2/Al_2O$, ratios (i.e., high site densities) care must be taken to employ methods which generate the desired isolated sites. Such methods include calcination of an ammonium form zeolite in a dry environment, for example, dry hydrogen, and maintaining a moisture free surface (i.e., a dry environment) at all times prior to and during silylation. Alternatively, isolated hydroxyl sites may be created by permitting minimal cation exchange thereby generating a low density of hydroxyls reducing the possibility of hydroxyl-hydroxyl interaction. Another method would be to increase the silica to alumina ratio of the zeolite which also reduces site populations and minimizes interactions.

The other type of reactive sites, the strained bridge sites, are generated from hydrogen bonded hydroxyl sites by dehydroxylation. Hydrogen bonded hydroxyl sites may first be generated by calcining an ammonium form zeolite in moist air and particularly by cooling in moist air after decomposition of the ammonium form to temperatures below 100° C. If the population of hydroxyls so generated is high enough then they may be close enough to each other to interact through hydrogen bonds. Such sites are essentially unreactive with silylating agents, however, if this surface is again heated this time in a dry environment to temperatures above about 300° C. these sites collapse losing chemical water leaving behind a strained bridge site. This site is reactive with silylating agents. Dehydroxylation is schematically represented below:

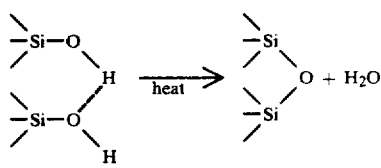

Mixtures of reactive sites (isolated hydroxyls and strained bridge sites) can be generated by varying the conditions of dryness and activation temperature.

SILYLATION

Silylation is performed by contacting the zeolite under anhydrous conditions with either vaporous or liquid organosilanes or by dissolving the organosilane in a dry organic solvent, such as hexane, heptane, naphtha or lube oil, and contacting the solution with the zeolite, with or without the metal hydrogenation component present, at from 20° to 500° C. depending on the zeolite being treated and the silane used (as is explained in greater detail below). The silylating solution will contain from about 0.01 to 20% silane, preferably 1 to 5% silane (by volume).

If the organosilane is not reacted directly with the surface as a vapor or liquid then it may be used as an organic solution where the solvent is preferably non polar and non aromatic and should preferably contain no greater than 10 ppm water. Total free water content of both the zeolite and the solvent should not exceed 10 ppm.

For example, acetone, toluene, ethylacetate and 1,4 dioxane all react with zeolitic sites at conditions needed to form a stable silylated surface and are therefore unsatisfactory solvents whereas n-hexane, n-pentane, and carbon tetrachloride and white oils are unreactive with the zeolite and for that reason are satisfactory.

The concern with solvent dryness is not only that water will hydrolyse the silylating molecule because, at least for hexamethyldisiloxane (HMDSO) this occurs only slowly. The problem also is that water can interact with the zeolite's reactive sites which could in turn alter or block the reaction of the reactive sites with HMDSO or other silylating agents. Surface moisture can block access by the silylating agent to the internal reactive sites thereby limiting silylation to the external reactive sites.

Silylation is preferably performed after the catalyst has been loaded with metal and following at least partial thermal decomposition (calcination) of the NH$_4^+$ sites and complete decomposition of any organic nitrogen templating agent.

The initial reaction at room temperature with isolated sites is to possibly form a surface "ether" link through trimethylsilyl (TMS) groups like those described by Kerr in U.S. Pat. No. 3,682,996. For example, the reaction of a reactive isolated hydroxyl site with HMDSO would be:

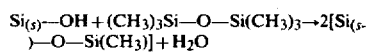

The reaction with strained bridge sites with HMDSO could be exemplified by:

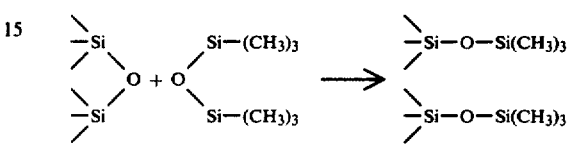

It is expected that silylated species generated by either of the above reaction sequences will experience some form of condensation-polymerization reaction as temperature increases.

A possible condensation product is:

Scheme 1

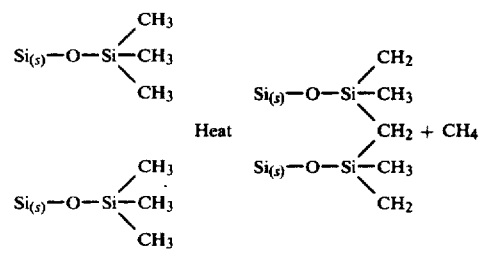

The condensed surface is expected to be stable in H$_2$ atmospheres up to 550° C. This type of surface is therefore different from the surfaces described by both U.S. Pat. No. 3,622,996 (pendant silyl groups) and Mitchell U.S. Pat. No. 3,980,586 but is similar to the secondary reaction product observed by McAteer in the reaction of tetramethyl silane with H zeolite Y. (ACS advances in Chemistry Sieves No. 121, "Molecules Sieves" Edited: Meier & Uytterhoeven).

Because of the relative ease with which the internal reactive sites can be substituted by the silane in large pore zeolites (because of the ease with which the silane can enter the pores of the zeolite) the *initial* silylating contact temperature may be low to moderate i.e. 25°-200° C. This is to be contrasted with small pore zeolites which require higher contact temperatures because of the difficulty encountered by the silane in diffusing to the reactive sites.

In both cases (i.e. small and large pore zeolites) the final state of the silylated surface (i.e., the degrees of condensation-polymerization) will be determined by the highest temperature that the surface experiences either during silylation, subsequent activation or when the catalyst is employed on oil. Depending on pore size, condensation-polymerization reactions between neighboring silyl groups themselves and also with unreacted sites may begin at about 25° C. (large pore) and become more extensive as the temperature is raised.

Condensation-polymerization may be conducted as an independent operation or may be conducted in situ in the catalytic dewaxing environment (as a direct consequence of the catalytic dewaxing process conducted at said elevated temperatures). In either case, the atmosphere employed is inert or reducing and is preferably hydrogen or contains hydrogen. Such deliberate or in situ heating is conducted to form a stable surface. The temperatures chosen for imparting this stability are usually at or above the temperature of the subsequent catalytic process, but preferably about 300° to 500° C., more preferably about 400° to 500° C.

HYDROXYL SITE PROTECTION

Although a change in pore volume and sorption properties are very desirable and is achieved by the silylation of reactive sites it is also important that some hydroxyl sites be protected so that ultimately the modified catalyst is active.

CATALYSTS

Three series of catalysts were studied. The A series are derived from Zeolite Y (large pore), the B series from offretite (intermediate pore) and the C-series from mordenite (intermediate pore).

MATERIAL A = NA ZEOLITE Y

Zeolite Y received from Union Carbide Corporation in the Na form had the following oxide composition:

$$Na_2O.Al_2O_3 4.4SiO_2 8.9H_2O$$

with a corresponding unit cell formula:

$$Na_{60}[(AlO_2)_{60}(SiO_2)_{132}].250H_2O$$

CATALYST A-1

TABLE I

| | FEEDSTOCK INSPECTIONS | | | | | |
|---|---|---|---|---|---|---|
| | Western Canadian[1] 150N | Western Canadian 600N | Primol 185 | Atmospheric Light Gas Oil A | B | Light Arabian/ Texas 150N Blend |
| Viscosity @ 40° C., CST | 25.40 | — | 38.4 (@ 37.8° C.) | — | — | 28.24 (@ 37.8° C.) |
| VI | 95 | — | 91 | — | — | 116 |
| Pour Point °C. | 6 | 50 | −26 | +3 | +3 | +33 |
| Density @ 15° C. | 0.870 | 0.874 | | 0.857 | 0.857 | 0.866 |
| Refractive Index @ 60° C. | 1.4659 | 1.4672 | 1.4626 | 1.4609 | 1.4636 | 1.4619 |
| Saturates, wt % | 80.5 | — | 100 | — | — | — |
| Aromatics, wt % | 18.3 | — | 0.0 | — | — | — |
| Polars, wt % | 1.1 | — | 0.0 | — | — | — |
| Basic Nitrogen, ppm | 5 | 14.4 | 0.0 | 59.4 | 82.2 | — |
| Sulfur, wt % | 0.19 | 0.16 | 0.0 | 0.26 | 0.39 | 0.24 |
| GCD (°C. at % off) | | | | | | |
| 5 | 344 | 412 | 317 | 262 | 254 | 368 |
| 10 | 361 | 451 | 336 | 285 | 280 | 385 |
| 30 | 395 | 476 | 382 | 320 | 318 | 417 |
| 50 | 417 | 498 | 425 | 337 | 334 | 436 |
| 70 | 436 | 522 | 457 | 352 | 349 | 453 |
| 90 | 459 | 541 | 494 | 375 | 371 | 473 |
| 95 | 472 | 556 | 509 | 385 | 381 | 482 |
| Wax Content wt %[2] | — | 17.1 | — | — | — | 14 |

[1]partly solvent dewaxed at +6° C. pour point
[2]calculated for products filtered at −5° C. from 1:1 MEK/MIBK at 2:1 solvent:oil.

There must be a balance between sufficient constriction and the retention of some of the acidic hydroxyl sites.

If the organosilane used has easy access into the pores of the zeolite, complete silylation of the internal and external hydroxyl groups may be possible.

In such cases methods for protecting some hydroxyl sites are needed. Such protection can be achieved by generating a mixed population of isolated hydroxyl sites (i.e., those which react with the organosilane) and hydrogen bonded hydroxyl sites (which do not react strongly with organosilanes). If too many non reactive hydrogen bonded hydroxyl sites are generated the surface can be subjected to dehydroxylation conditions which result in the generation of some strained bridge sites which are reactive with the organosilane silylating agents. Any hydrogen bonded hydroxyls remaining after dehydroxylation are then available as the catalytically active hydroxyls. Other methods of protection include blocking of the potential hydroxyl site with cations. For example, a sodium form zeolite can be partially exchanged, with $NH_4^+$ salt solutions, calcined to generate isolated hydroxyl sites, treated with silylating agent under dry conditions, then re-exchanged and calcined to generate new reactive hydroxyl sites.

Material A was exchanged in 0.5 N $NH_4NO_3$ at reflux for 2 hr using a 10 volume excess of solution then filtered and washed in water.

The crystals were re-slurried in a two volume excess of a dilute aqueous $NH_4OH$ solution (pH 10) and an aqueous solution containing about 0.15 wt% of $Pd(NH_3)_4Cl_2$ was added dropwise over a 5 hour period at room temperature to give a nominal loading of 0.25 wt % Pd. After washing, filtering the sample was dried at 120° C. (1 hr.) i.e., the sample contained $NH_4^+$ ion.

CATALYST A-2

Calcination of A-1 at 500° C. in moist air (laboratory air with ambient humidity), 1 hour yielded an $NH_4^+$ free catalyst with the oxide composition:

$$0.45Na_2O Al_2O_3.4.4SiO_2$$

The powder was pressed, crushed and screened to 7–14 mesh (Tyler) loaded into a reactor and reduced in $H_2$ at 400° C. 55% of the sites were nominally in the hydrogen form.

HMDSO MODIFIED A CATALYSTS

CATALYST A-2M

Preparation was exactly as for A-2 except that after H₂ reduction, the catalyst was cooled to 40° C. in moist air and treated with a solution of 5 volume % hexamethyldisiloxane (HMDSO) in Primol 185 (a white oil containing no aromatics or polars, see Table 1) at 1 v/v/h for 5 hours at 40° C. Following this, the catalyst was washed with Primol 185 for 2 hours at 1 v/v/h. Feed was admitted at 350° C. (see Table 3). At this temperature considerable condensation-polymerization of the surface silyl species is expected.

CATALYST A-1M(A)

The catalyst was prepared from catalyst A-1. The A-1 catalyst was air calcined at 250° C., cooled in air then pressed, and screened to 7-14 mesh (Tyler) and loaded into a reactor. At this stage 14% of all the sites are nominally in the hydrogen form. There it was dried in N₂ at 200° C. for 1 hour, then in dry H₂ at 200° C. for 2 hours, followed by treatment at 40° C. in 5% HMDSO/Primol 185 at 1 v/v/h for 10 h; finally, the catalyst was heated to 500° C. in H₂ prior to admitting feed.

CATALYST A-1M(B)

After 160 hours on stream (Western Canadian 600 N) the catalyst (A-1M(a)) was cooled to 250° C. in hydrogen and a solution of 5 vol. % HMDSO was passed over the catalyst at 1 v/v/h for 5 hours. Feed was readmitted and the temperature raised to 350° C. Extensive condensation-polymerization is expected under this treatment condition.

PRODUCT B: OFFRETITE

Various synthetic offretites were prepared by methods similar to those described by Jenkins (U.S. Pat. No. 3,578,398), Rubin (Canadian Pat. No. 934,130) and especially by Whittam (GB Pat. No. 1,413,470).

The synthetic offretite material used in this example had the following typical anhydrous composition in the range:

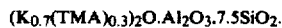

$(K_{0.7}(TMA)_{0.3})_2O.Al_2O_3.7.5SiO_2$.

In the preparation of the synthetic offretite of the examples, the ingredients were used in the following molar ratio:

| | |
|---|---|
| Al₂O₃.3H₂O (Bayerite) | 1 |
| KOH | 16.1 |
| TMACl | 1.8 |
| Colloidal SiO₂ (as Ludox LS 30 wt % SiO₂) | 20 |
| H₂O | 414 |

The following example yields ~250 gms of product. Dissolve 274.4 gms KOH in 800 gms H₂O. Add 46.8 gms Al₂O₃.3H₂O and heat to 80° C. with mixing until clear. Cool to room temperature. Add above mixture to 1200 gms of Ludox LS over 15 min. with stirring. Age the gel for 5 days. After 5 days add a solution of 59.1 gms TMACl in 600 gms H₂O. Reflux mixture for 28-40 hrs. in a stirred vessel. Filter and wash to ph≦11 with de-ionized H₂O.

Each of the offretite catalysts was prepared in the following general sequence:
(a) the zeolite was refluxed in a 10-20 volume excess of deionised water for 1 hour then filtered (or centrifuged). This procedure was repeated twice.
(b) The zeolite was dried at 120° C. for 1 hour then calcined in an air flow at 425° C. for 16 hours, at 550° C. for 1 hour and finally at 600° C. for 1 hour to decompose TMA ions.
(c) The zeolite was refluxed with stirring in a 10 volume excess of NH₄NO₃ for 2 hrs.

Catalyst B-1 was exchanged with 2.0 N NH₄NO₃, washed and dried at 120° C. then calcined at 550° C. in moist air and reexchanged in 2.0 N NH₄NO₃ again for 2 hours.

B-2 was exchanged twice in 0.5 N NH₄NO₃ but without intermediate calcination.

B-3 was exchanged once with 0.5 N NH₄NO₃.

B-4 was prepared from material B by washing and calcination as in steps (a) and (b) above, then by refluxing with an H₄ EDTA solution to yield a product having 16/1 silicon to alumina ratio. This material was then exchanged with 0.5 N NH₄NO₃

(d) Pt was exchanged onto the NH₄+ form of each zeolite. The zeolite was slurried with a 10 volume excess of deionized water and about 1 volume of an aqueous solution of 0.025 M Pt(NH₃)₄Cl₂ was added incrementally to the stirred slurry over a 7 hour period at room temperature then left to stir for an additional 16 hour. The zeolite was then washed free of Cl with de-ionized water and dried at 120° C. for 1 hour.

Preparation procedures and catalyst compositions are summarized in Table 2. In all cases, the catalysts were air calcined at 550° C. for 2 hrs. following Pt salt exchange and forming into 7-14 mesh pellets.

TABLE 2

| | TYPE B CATALYSTS (FROM OFFRETITE) | | | |
|---|---|---|---|---|
| Catalyst | B-1 | B-2 | B-3 | B-4 |
| NH₄NO₃ exchange | | | | |
| No. of exchanges/ | | | | |
| Molarity/Reflux time (h) | 2/2/2 | 2/0.5/2 | 1/0.5/2 | 1/0.5/2 |
| Air calcination | | | | |
| between exchanges °C./h | 550/2 | none | none | none |
| K/wt % (anhydrous basis) | 1.4 | 2.1 | 2.9 | — |
| K/Al | 0.13 | 0.19 | .26 | — |
| Si/Al₂ | 8.1 | 8.1 | 7.5 | 17.2 |
| Pt wt % (nominal) | 0.5 | 0.5 | 0.5 | 0.5 |

All catalysts were reduced in the reactor in a flow of H₂ at up to 400° C.

HMDSO Modified B Catalysts

Following the reduction in hydrogen at 400° C. some of the B series catalysts were modified by treatment with HMDSO at various temperatures and, of these catalysts, some were subsequently stripped again in H₂ at between 400°-550° C. at 3000 SCF/BBL for 2 hours. Thus, B-1M(300) refers to catalyst B-1, from Table 2 which has been HMDSO modified at 300° C.; B-2M(25)H is a form of the B-2 catalyst modified with HMDSO at 25° C. and post hydrogen stripped at 550° C., 3,000 SCF/BBL for 2 hrs, pure H₂.

All HMDSO treatments of catalysts were performed in a dry H₂ atmosphere at 50 psig using 5 vol. % HMDSO in Primol 185 at 1 v/v/h for 5 hours.

B-1M(300)

The modification of B-1 with HMDSO was performed after the catalyst had been run in an oil, (Western Canadian 150N). To ensure that treatment was on an essentially hydrocarbon free surface, the B-1 catalyst was first washed with naphtha and $H_2$ stripped at 550° C. for 2 hours. Then the catalyst was cooled to 300° C. and 5% HMDSO in Primol 185 was admitted.

B-1M(300)H

Following a study on Western Canadian 150N, the B-1M(300) catalyst was washed with naphtha then hydrogen stripped at 550° C. for 2 hours.

B-2M(25)H

The modification of the B-2 catalyst was performed after the catalyst had been run in an oil (Western Canadian 150N). The catalyst was washed with naptha then $H_2$ stripped at 550° C. to remove hydrocarbon residues prior to the HMDSO treatment at 25° C. Following HMDSO treatment, the catalyst was again $H_2$ stripped at 550° C.

B-4M (40) H

The B-4 catalyst was modified with 1% vol. HMDS (hexa methyl disilazane) in Primol 185 at 40° C. on a freshly hydrogen reduced surface then $H_2$ stripped at 500° C. After 500 hours on oil the catalyst was washed with naphtha and hexane heated to 550° C. in $H_2$ for 22 hrs. and treated again with a 5% vol. HMDS/Primol 185 solution at 40° C. The surface was washed in naphtha and hexane once more and heated in $H_2$ at 550° C. for 2 hours.

PRODUCT C: H-MORDENITE

Zeolon 900-H from the Norton Co. had the following anhydrous oxide composition:

0.29Na$_2$O.Al$_2$O$_3$.17.5SiO$_2$.

CATALYST C-1

Product C was exchanged at reflux with a 10 volume excess of 0.5 N NH$_4$NO$_3$ for 2 hours, washed free of NO$_3^-$ then exchanged with 10 volume excess of aqueous Pt(NH$_3$)$_4$Cl$_2$ to give a nominal loading of 0.5 wt % Pt. After washing to remove Cl$^-$, the catalyst was air dried at 120° C. (1 hour) than air calcined at 550° C. for 2 hours and formed into 7-14 mesh pellets.

The catalyst was reduced in the reactor at 400° C. in $H_2$.

HMDSO MODIFIED C-1 CATALYST (C-1M (300))

HMDSO treatment was performed after the catalyst had been run in an oil (Western Canadian 150N). The catalyst was washed with naphtha then $H_2$ stripped at 550° C. to remove hydrocarbon residues prior to HMDSO treatment. A 10 volume excess of the treat solution, 5% HMDSO in Primol 185 was passed over the catalyst at 300° C. at 1.0 v/v/h.

IR. MONITORING OF ORGANOSILANE REACTIONS

Transmission infrared spectroscopy is an excellent tool for monitoring the changes in acid site type and density of zeolites because they are transparent to IR above 1300 cm$^{-1}$ where valence vibrations occur. Highly transmitting spectra of 40-50 mg 2.5 cm diameter discs of pressed catalyst can be obtained by evacuating the disc at 140° C. to remove physically and hydrogen bonded water. All spectra shown were recorded at room temperature on a Beckman 4240 IR spectrometer.

SILYLATION OF ZEOLITE Y

The following FIGS. 1-4 demonstrate the importance of having reactive sites for silylation. FIG. 1 shows that vapor phase HMDSO does not react readily with a hydroxyl form zeolite Y when the hydroxyls are hydrogen bonded. It is seen that there is little or no change in the zeolitic hydroxyl band envelope centered around 3600 cm$^{-1}$. This broad feature (lack of distinct peaks) is indicative of interacting (hydrogen bonded) hydroxyl groups in the supercages and B cages (truncated octahedra) of zeolite Y. Such hydrogen bonded hydroxyls are unreactive with the silylating agents, in this case HMDSO, and are believed to be caused (in this case) by the presence of moisture on the zeolite Y surface.

On the other hand, discrete non-interacting hydroxyl species were created by decomposing A-1, the NH$_4$ form zeolite Y under dry conditions (FIG. 2). The bands due to the stretching vibrations of external hydroxyls 3740 cm$^{-1}$, supercage hydroxyls 3650 cm$^{-1}$ and B cage hydroxyls 3550 cm$^{-1}$ have been identified before by Uytterhoeven et al (J. Phys Chem 69 (6) 2117 (1965)). Each species is clearly not hydrogen bonded and each reacts extensively with HMDSO at 25° C. as evidenced by the disappearance of the hydroxyl bands and the appearance of new bands at 2980 cm$^{-1}$ and 2920 cm$^{-1}$ due to C-H stretching modes.

Further degassing and heating completely eliminated all trace of the hydroxyl modes and the C-H bands declined in intensity due to condensation-polymerization.

Another example of the effect of surface pretreatment of an A-1 material upon the extent of silylation is shown in FIG. 3.

A-1 was calcined in moist air (laboratory air containing ambient humidity) at 500° C. for 1 hr., cooled to room temperature (in effect generating A-2) then evacuated at 140° C. A mixed population of hydrogen bonded hydroxyls and isolated hydroxyls was generated (FIG. 3A). Note that the population of isolated internal hydroxyls is considerably higher in the case of A-2 (NaY exchanged in 0.5 N ammonium nitrate) than for the example shown in FIG. 1 (NaY exchanged in 2.0 N ammonium nitrate). This surface was subsequently exposed to 15 torr of dichlorodimethylsilane vapor (a highly reactive silylating reagent) for 12 minutes at room temperature then again evacuated at 140° C. to 5×10$^{-3}$ torr for 1 hr. The isolated sites were completely eliminated and new bands appeared near 2980 and 2920 cm$^{-1}$ indicating silylation. However the population of hydrogen bonded hydroxyls was unchanged (FIG. 3B).

This example demonstrates that the co-generation of hydrogen bonded hydroxyls and isolated hydroxyls can be used as an accurate control of the extent of silylation, since it is clear that of the two only the isolated hydroxyls react with the silylating agent added to the system. The unreacted hydrogen bonded hydroxyls remain and could provide catalytic activity.

However, a surface containing hydrogen bonded hydroxyl species may be activated so as to be reactive with organosilanes. This is achieved by dehydroxylating these hydrogen bonded hydroxyl species.

This is demonstrated by FIG. 4. A surface containing a mixed population of isolated hydroxyls, $NH_4^+$ and hydrogen bonded hydroxyls (FIG. 4A) was heated at high temperature (500° C.) for 45 minutes under vacuum (less than $10^{-3}$ Torr) yielding a low population of isolated sites, no hydrogen bonded sites and by inference a large population of strained bridge sites (FIG. 4B). Subsequent reaction of this surface with HMDSO vapor produced a large population of chemisorbed silyl species (bands at 2980 and 2920 $cm^{-1}$) which is substantially greater than would be expected had only the isolated species reacted. (Compare with the intensity of the 2980 and 2920 $cm^{-1}$ bands in FIG. 2C).

Thus, for the purposes of this specification, one or both of the two types of reactive sites should be generated to facilitate silylation.

As evidence of the completeness of the silylation of decomposed A-1 (hydrogen form, isolated hydroxyls), by HMDSO, the subsequent adsorption of pyridine vapour by the modified surface showed that adsorption occurred as hydrogen-bonded pyridine and as Lewis adsorbed pyridine but there were no sites for Bronsted adsorption by proton exchange to form pyridinium ions (no band at 1540 $cm^{-1}$) (FIG. 5).

The possibility that all Bronsted sites can be eliminated in zeolite Y means that the hydrocracking potential of the zeolite may also be destroyed, because Bronsted sites are generally thought to be needed to initiate C-C cleavage reactions.

Therefore methods for preserving catalytically active hydroxyls are appropriate with zeolite Y and other low silica to alumina ratio zeolites so that the modified system can function as a surface which is both diffusionally selective and catalytically active.

In one scenario a form of Na zeolite Y could be partly exchanged, calcined to generate isolated hydroxyl sites, treated with a silylating agent under dry conditions, then re-exchanged to expose new sites.

The level of exchange (e.g. ammonium exchange) of the original cationic species (i.e. Na in the case of sodium Y) may also determine the population of isolated hydroxyl species and therefore the extent of hydroxyl silylation. If only a few hydroxyl sites are created they may be, statistically far enough apart not to hydrogen bond even if the decomposition takes place in moist air (see FIG. 3). At higher exchange levels more hydrogen bonded species will be formed if the surface is calcined and cooled under moist conditions following the exchange step.

A possible variation on this would be to use $NH_4^+$ as the blocking ion. In this case, the population of $NH_4^+$ relative to the acidic hydroxyl sites can be controlled by the calcining temperature. After silylation, the catalyst may be post calcined at eg 500° C. to restore sites, rather than require another exchange as in the Na blocking case.

In this case it would be important to insure that hydroxyl sites generated from $NH_4^+$ decomposition were not all consumed by possible bridging reactions with neighboring silyl species.

A preferred way of preserving sites for hydrocracking activity of low $SiO_2/Al_2O_3$ ratio zeolite catalysts (eg zeolite Y) would be to generate a mixed population of hydrogen bonded hydroxyls and discrete (isolated) hydroxyl sites. A preferable method to accomplish this end would be to first partially decompose an $NH_4^+$ form zeolite Y and expose the newly formed hydroxyls to moisture thereby creating hydrogen bonded hydroxyls. This is what is occurring with the catalyst of series A when calcination is conducted in moist air followed subsequently by the step of permitting the calcined material to come to room temperature in moist air. The same result would be achieved if the calcination was conducted under anhydrous conditions but the subsequent cooling to room temperature were conducted in the presence of a moist atmosphere, for example, moist air (laboratory air containing ambient humidity) or some other atmosphere into which moisture has been introduced. The amount of moisture and the duration of exposure of the zeolite to the moist atmosphere will determine the extent to which the hydroxyl groups which are generated will be in the hydrogen bonded form. Subsequent drying of this surface and decomposition of the remaining $NH_4^+$ sites in a dry environment will generate other hydroxyls which are isolated (non-hydrogen bonded) as well as strained bridge sites from dehydroxylation of hydrogen bonded hydroxyl sites. Both of these sites are available for reaction with HMDSO or other silylating agents providing dry conditions are maintained.

The ratio of hydrogen bonded to reactive sites (isolated hydroxyls and strained bridge sites) will determine the extent of silyation. The hydrogen bonded hydroxyls remain after silylation and are effective as sites for hydrocracking. It is left to the practitioner to determine the degree and extent of generation of hydrogen bonded hydroxyls as may be required by his specific application. All that is required however is that there be some protected, hydrogen bonded hydroxyls which are unreactive with silylating agent and that there be some reactive sites (isolated hydroxyls and/or strained bridge sites) generated which are reactive with silylating agents.

It should be noted that all silylating reactions were performed on metal loaded zeolite Y, however this is not critical to the successful practice of the invention. The reactivity and extent of reaction of Y type materials with HMDS and HMDSO was independent of the presence of this metal, at least up to Pd loadings of 0.5 wt%.

SILYLATION OF OFFRETITE

Unlike the zeolite Y system, the reactions of HMDS and HMDSO with the smaller pore H-form offretite were always incomplete even at temperatures up to 500° C. and on surfaces having mostly discrete (isolated) hydroxyl species. With offretite, large populations of isolated sites can be generated even after the hydroxylated form has been exposed to moisture. Thus the strategems employed when dealing with large pore low silica alumina ratio zeolites such as zeolite Y need not be utilized when dealing with the intermediate pore zeolites such as offretite where access of organosilanes into the pores may be thermally limited.

Despite the access problem, permanent changes in the behaviour of offretite can be affected by silylating at higher temperatures, as previously discussed. Again the zeolite must be predried to remove physically adsorbed and hydrogen bonded water to react any of the internal sites.

The vapour phase reaction of HMDSO with a disc of catalyst B-1 is shown in FIG. 6. The spectrum of hydrogen form offretite is similar to that of offretite, reported by Barthomeuf V. et al., J. Catal, 57, 136 (1979). Bands at 3610 and 3550 $cm^{-1}$ are the O-H stretching modes of the hydroxyl species located in the channels and cages respectively, while the band at 3744 cm$^{-1}$ (B) is due to external surface hydroxyl species. The admission of HMDSO vapour to this surface at 25° C. had almost no effect on the hydroxyls but a weak C-H band appeared near 2980 cm$^{-1}$ (FIG. 6B).

Readmission of HMDSO at 25° C. followed by heating to 300° C. did cause reaction of about 30% of each of the hydroxyl types but the band due to C-H species was still quite small (FIG. 6C). If each hydroxyl had been replaced by a TMS group, a much larger 2980 cm$^{-1}$ adsorption band would have been expected (see, for example, the intensity at 2980 cm$^{-1}$ in the zeolite Y series experiments shown in FIG. 2).

It is apparent that a simultaneous silylation and condensation-polymerization must be taking place on offretite. In order to promote reaction the temperature must be raised to minimize diffusional constraints but in so doing the initial reaction products are made sufficiently energetic to extensively bridge with neighbouring sites.

Further heating of this surface at 550° C. in H$_2$ (FIG. 6D) again reduced the hydroxyl population and the C-H intensity also declined, consistent with further bridging.

CATALYTIC DEWAXING

Performance of Untreated Catalysts A-2

The untreated catalyst, A-2 was contacted with a Western Canadian 600 N waxy raffinate at 300, 325 and 370° C. at 4.14 MPag H$_2$ and 1.0 v/v/h (Table 3). The oily fraction remaining, i.e. the stripped products, were still very waxy, indicative of a process which is not shape selective for charge molecules.

In fact the SiO$_2$ gel separations and a measured wax content by solvent separation showed that A-2 is actually anti-selective for wax because the products had a higher concentrations of saturates than the feed. Aromatics and polars were preferentially reacted. Since aromatics and polars are generally among the larger molecular species, it is to be expected that the fraction of product boiling roughly in the same range as the feed should be low because molecules of all sizes and types have access to the hydrocracking surface.

At 370° C. reactor temperature the oil yield is only 35%. These results are entirely predictable for a large pore hydrophilic, acidic surface.

Performance of the Modified Catalyst (A-2)M

HMDSO treatment of the A-2 (H form Y) catalyst completely altered its hydrocracking characteristics on Western Canadian 600 N waxy raffinate.

At 410° C. only 20% of the raffinate had been converted to product boiling below the ibp of the feed (Table 3). This is due in part to A-2 (HMDSO) being catalytically selective for wax. Many molecules are now constrained by the modified pore and molecules with narrower cross-section will be admitted preferentially. As a consequence the pour point and wax content in the products are reduced.

Performance of the Modified Catalyst A-1M(a)

The A-1 (HMDSO) catalyst was actually "modified" twice. In case (a), the catalyst was first modified in the form where the site population comprised 45% Na+, 41% NH$_4$+ and 14% hydroxyls. Since the hydroxyls were generated by calcination in moist air then cooled in moist air they were hydrogen bonded so that subsequent reaction with HMDSO should be minimal.

The catalyst was active but only slightly selective for wax on Western Canadian 600 N waxy raffinate (Table 3) and except for a slight pour reduction the catalyst behaviour was like that of catalyst A-2.

A-1M(b)

The surface was retreated with HMDSO/Primol 185, after in situ activation under dry conditions and following 160 hrs on Western Canadian 600 N raffinate. The sites generated by this procedure should be isolated hydroxyls and strained bridge sites and, therefore, reactive with HMDSO. The result was a dramatic improvement in performance (Table 3). The oil product yield was relatively high and the pour point dropped to −2° C. at a mild reactor condition (350° C.). In this form zeolite Y behaves as a selective hydrodewaxing catalyst. The relatively low reactor temperature required is evidence that excellent catalytic sites have been preserved.

Performance of Untreated Offretite Catalysts

The offretite catalysts B-1 and B-2 both dewaxed Western Canadian 150 N, +6° C. pour point (Table 4, FIG. 7) and appeared to have similar but fairly low selectivity. That is, yields of dewaxed oil after stripping for a given pour point, were lower than would be obtained by solvent dewaxing to the same pour point. For example between +6° and −20° C. pour point, about 10% dry wax can be recovered by solvent dewaxing, so if the hydrodewaxing process were perfectly selective then there would be only 10% conversion, i.e. a 90% dewaxed oil yield. Instead the yield is below 80%. This low yield may be a result of the pore being too large and/or to the participation of the external surface in hydrocracking.

Performance of the Modified Offretite Catalysts

The effects of the temperature required for modification on the extent of silylation of offretite identified in the spectroscopic studies is again revealed in the catalytic tests.

Thus catalyst B-2 M(25)H modified at only 25° C. then post stripped in H$_2$, had the same activity and selectivity as the untreated parent, B-2 on Western Canadian 150 N, (Table 4). But the catalyst modified at 300° C., B-1 M(300) and its H$_2$ stripped counterpart B-1 M(300)H both exhibited better selectivity, in accord with the IR result that surface silylation is significant only at higher temperatures with offretite (Table 4, FIG. 7).

The yield of dewaxed oil for a given pour point was about 5-7% higher for the high temperature modified catalysts. Post H$_2$ stripping at 550° C. further improved performance of the 300° C. modified catalyst in that the activity was increased without loss of selectivity.

A highly condensed (bridged) surface structure appears to be most desirable for improved dewaxing with offretite. The bridged surface apparently remained stable up to 550° C. in H$_2$ which is higher than any temperature likely to be encountered in hydrocracking in a reducing gas medium or under conditions of H$_2$ stripping conceivably needed to rejuvenate a catalyst.

The B-4M (40) H catalyst successfully dewaxed an Arabian Light/Texas 150 N raffinate blend from +33° to −15° C. pour point. This catalyst also exhibited much better activity maintenance on atmospheric light gas oil than the B-3 catalyst (Table 5).

offretite. Again high temperature modification with HMDSO resulted in improved selectivity of dewaxed oil are about 6-9% higher for a given product pour point with C-1 M(300) (Table 6).

TABLE 3
DEWAXING WESTERN CANADIAN 600N (80-449) WITH TYPE A AND MODIFIED TYPE A CATALYSTS
(From Zeolite Y)

| CATALYST | A-2 | | | A-2M | | | A-1M(a) | A-1M(b) |
|---|---|---|---|---|---|---|---|---|
| Time on Stream, (h) | 216-232 | 240-264 | 288-320 | 169-205 | 213-225 | 237-245 | 130-160 | 200-230 |
| Temperature °C. | 300 | 325 | 370 | 250 | 390 | 410 | 350 | 350 |
| Pressure, MPagH$_2$ (psig) | 4.14(600) | | | 4.14(600) | | | | |
| LHSV, v/v/h | 1.0 | | | 1.0 | | | | |
| Excess Gas Rate, kmol m$^{-3}$ (SCF/bbl) | 37.8(5000) | | | 37.8(5000) | | | | |
| Average Yield, wt % (1) | 80 | 75 | 35 | 90 | 81 | 80 | 45 | 62 |
| Pour Point, °C. | 50 | 50 | 56 | 45 | 42 | 43 | 48 | −2 |
| Wax Content (2), wt % | 18.9 | — | — | — | 8.1 | — | — | <1 |
| Refractive Index at 60° C. | 1.4644 | 1.4628 | 1.4580 | 1.4682 | 1.4700 | 1.4684 | 1.4678 | 1.4744 |

(1) Yield of ibp. + (356° C.)
(2) Calculated for products filtered at −5° C. from 1:1 MEK:MiBK; 2:1 Solvent:Oil

TABLE 4
DEWAXING WESTERN CANADIAN 150N WITH TYPE B AND MODIFIED TYPE B CATALYSTS
(From Offretite)

| Catalyst | B-1 | | B-1M(300)H | | | B-1M(300) | | | B-2 | | B-2M(25)H |
|---|---|---|---|---|---|---|---|---|---|---|---|
| Time on Stream hr | 14 | 28 | 42 | 56 | 63 | 81 | 105 | 119 | 14 | 28 | 19 |
| Temperature °C. | 302 | 316 | 302 | 316 | 343 | 316 | 343 | 302 | 302 | 316 | 302 |
| Pressure MPagH (psig) | 4.1(600) | | 4.1(600) | | | 4.1(600) | | | 4.1(600) | | 4.1(600) |
| LHSV v/v/h | 1.0 | | 1.0 | | | 1.0 | | | 1.0 | | 1.0 |
| Excess gas rate kmolm$^{-3}$ (SCF/bbl) | 37.8(5000) | | 37.8(5000) | | | 37.8(5000) | | | 37.8(5000) | | 37.8(5000) |
| Average Yield wt %$^{(1)}$ | 69 | 66 | 87 | 83 | 76 | 75 | 71 | 83 | 79 | 70 | 78 |
| Pour Point °C. | −33 | −42 | −14 | −21 | −34 | −30 | −39 | −21 | −18 | −30 | −18 |
| Viscosity @ 40° C. (cSt) | — | — | 30.86 | 32.63 | — | — | — | — | — | — | — |
| VI | — | — | 86 | 83 | — | — | — | — | — | — | — |

$^{(1)}$Yield of ibp + (315° C.)

TABLE 5
DEWAXING WESTERN CANADIAN ATMOSPHERIC LIGHT GAS OIL AND LIGHT ARABIAN/TEXAS 150N BLEND TYPE B AND MODIFIED TYPE B CATALYST (From Offretite)

| Feed | Atmospheric Light Gas Oil | | | | Atmospheric Light Gas Oil | | | | | | Light Arabian/Texas 150N Blend | | | |
|---|---|---|---|---|---|---|---|---|---|---|---|---|---|---|
| Catalyst | B-4M(40)H | | | | B-3 | | | | | | B-4M(40)H | | | |
| Hours on Stream | 1897-1933 | 1945-57 | 2070-2114 | 2118-2258 | 233-249 | 269-293 | 325-365 | 381-417 | 429-467 | 850-82 | 935-51 | 979-1019 | 1035-67 | 1075-1103 | 1123-1195 |
| Temperature °C. | 400 | 320 | 330 | 350 | 325 | 350 | 375 | 400 | 420 | 316 | 330 | 343 | 360 | 380 | 400 |
| Pressure MPag (psig) | 4.14(600) | | | | 4.14(600) | | | | | | 4.14(600) | | | | |
| LHSV v/v/hr | 1.0 | | | | 1.0 | | | | | | 1.0 | | | | |
| Excess Gas Rate kmolm$^{-3}$ (SCF/bbl) | 22.5(3000) | | | | 22.5(3000) | | | | | | 37.8(5000) | | | | |
| Dewaxed Oil Yield (wt%)$^{(1)}$ | 56 | — | 84 | 80 | 75 | 69-77 | 80 | 80 | 66 | 79 | 77 | 75 | 69 | 65 | 54 |
| Pour Point °C. | <−48 | −9 | −1 | −20, −18 | −12, −6 | −30, −7 | −9, +3 | −3 | −18, −24 | +27 | +21 | +7 | −3 | −15 | — |

$^{(1)}$Stripped at 66° C. and 3 Torr.

Mordenite

A very brief study was conducted on a mordenite catalyst using conditions similar to those used with

TABLE 6
DEWAXING WESTERN CANADIAN 150N WITH TYPE C AND MODIFIED TYPE C CATALYST
(FROM MORDENITE)

| CATALYST | C-1 | | C-1M(300) | | |
|---|---|---|---|---|---|
| Time on Stream (Hrs) | 14 | 28 | 49 | 69 | 83 |
| Temperature °C. | 288 | 302 | 302 | 330 | 343 |
| Pressure MPagH$_2$(psig) | 4.14(600) | | 4.14(600) | | |
| LHSV v/v/h | 1.0 | | 1.0 | | |
| Excess gas rate kmolm$^{-3}$(SCF/bbl) | 37.8(5000) | | 37.8(5000) | | |
| Yield wt % (260° C.+) | 84.1 | 74.7 | 86.5 | 83.0 | 81.3 |

TABLE 6-continued

DEWAXING WESTERN CANADIAN 150N WITH TYPE C AND MODIFIED TYPE C CATALYST (FROM MORDENITE)

| CATALYST | C-1 | | C-1M(300) | | |
|---|---|---|---|---|---|
| Pour Point °C. | −14 | −19 | −15 | −18 | −22 |

What is claimed is:

1. A method for selectively dewaxing a waxy hydrocarbon oil feedstock and enhancing the yield of dewaxed oil which method comprises contacting said waxy hydrocarbon oil stock in the presence of hydrogen and under conditions of pressure, temperature and flow velocity sufficient to effect the dewaxing with a silylated zeolite, which silylated zeolite is prepared from a zeolite which (1) has been modified by reaction under anhydrous conditions with an organosilane wherein the zeolite to be modified possesses reactive sites capable of reacting with the organosilane and wherein the organosilane is capable of entering into the channels of the zeolite and reacting with the reactive sites present therein as well as reacting with reactive sites present on the external surface of said zeolite and (2) has been loaded with a catalytically active hydrogenating metal component.

2. The method of claim 1 wherein the zeolite is any natural or synthetic zeolite having an average pore diameter of from about 7 A or greater.

3. The method of claim 2 wherein the zeolite is a Y, X, L omega.

4. The method of claim 1 wherein the zeolite is any natural or synthetic zeolite having an average pore diameter of less than about 7 A.

5. The method of claim 4 wherein the zeolite is offretite, mordenite, offretite type zeolites, ZSM-5, erionite.

6. The method of claim 2, wherein the zeolite has been calcined and cooled in the presence of a moist atmosphere and subsequently calcined and cooled under anhydrous conditions prior to being chemically modified by reaction under anhydrous conditions with an organosilane.

7. The method of claim 1 wherein the silylated metal loaded zeolite is heated in an inert or reducing atmosphere prior to being exposed to waxy oil.

8. The method of claim 6 wherein the silylated, metal loaded zeolite is heated in an inert or reducing atmosphere prior to being exposed to waxy oil.

9. The method of claim 6 wherein the zeolite employed is zeolite Y.

10. The method of claim 1 wherein the zeolite employed is offretite or an offretite type zeolite.

11. The method of claim 1, 2, 3, 4, 5, 6, 7, 8, 9 or 10 wherein the organosilane employed has the formula $$SiR_yX_{4-y} \text{ or } (R_wX_{3-w}Si)_2\text{-}Z$$

wherein R is H or a $C_1$–$C_{10}$ alkyl, aryl, alkoxy or aralkyl, X is halogen, Z is O or NH or substituted amines or amides and Y is 1 to 4 and w=1 to 3.

12. The method of claim 11 wherein the organosilane is hexamethyldisilazane (HMDS) or hexamethyldisiloxane (HMDSO).

13. The method of claim 11 wherein the catalytically active hydrogenating metal compound is selected from the group consisting of Group VI and Group VIII metals of the Periodic Table.

14. The method of claim 11 wherein steps (a) and (b) of the zeolite modification sequence may be practiced in any order.

15. The method of claim 12 wherein the waxy hydrocarbon oil is a petroleum oil.

16. The method of claim 12 wherein the waxy hydrocarbon oil is a lube or transformer oil.

17. The method of claim 13 wherein the waxy hydrocarbon oil is a petroleum oil.

18. The method of claim 13 wherein the waxy hydrocarbon oil is a lube or transformer oil.

19. The method of claim 13 wherein the catalytically active hydrogenating metal compound is selected from the group consisting of platinum and palladium and wherein said catalytically active hydrogenating metal compound is present in the range of 0.1 to 2.0 wt.% based on dry zeolite.

20. The method of claim 19 wherein the catalytically active hydrogenating metal compound is present in the range of 0.2 to 0.5 wt.% based on dry zeolite.

21. The method of claim 2, wherein the zeolite has been calcined under anhydrous conditions and cooled in the presence of a moist atmosphere and subsequently calcined and cooled under anhydrous conditions prior to being chemically modified by reaction under anhydrous conditions with an organosilane.

22. The method of claim 7 or 8 wherein the heating in an inert or reducing atmosphere prior to being exposed to waxy oil is at a temperature of from about 300° to 500° C.

23. The method of claim 6 or 21 wherein the zeolite used is an ammonium from zeolite, and wherein said anhydrous calcination is to temperature above about 300° C.

* * * * *